(12) United States Patent
Alapati et al.

(10) Patent No.: US 8,898,298 B2
(45) Date of Patent: Nov. 25, 2014

(54) PROCESS OBSERVER AND EVENT TYPE LINKAGE

(75) Inventors: Ranjit Alapati, Bangalore (IN); Jens-Christoph Nolte, Sandhausen (DE)

(73) Assignee: SAP SE, Walldorf (DE)

( * ) Notice: Subject to any disclaimer, the term of this patent is extended or adjusted under 35 U.S.C. 154(b) by 137 days.

(21) Appl. No.: 13/595,414

(22) Filed: Aug. 27, 2012

(65) Prior Publication Data

US 2014/0059211 A1    Feb. 27, 2014

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

2008/0004856 A1\* 1/2008 Avitzur et al. ................. 703/17

\* cited by examiner

*Primary Examiner* — Tu Nguyen
(74) *Attorney, Agent, or Firm* — Fish & Richardson P.C.

(57) ABSTRACT

The disclosure generally describes computer-implemented methods, software, and systems for monitoring processes. A computer-implemented method includes receiving, at a process-observer-enabled server, a communication from a non-process-observer-enabled server; translating at least event information in the communication from a non-process-observer-compatible format to a process-observer-compatible format; adding an event in the process-observer-compatible format to a process observer queue for subsequent processing by a process observer with other events. In a process observer, the events are processed from the process observer queue, application events are correlated with the defined a workflow/process model, and process instances are created in a process log.

21 Claims, 6 Drawing Sheets

| Change View "Event Type Linkages": Details | |
|---|---|
| New Entries | |
| Object Category | BOR Object Type |
| Object Type | BUS2032 |
| Event | CREATED |
| Receiver Type | QV6CLNT002 |

602
604

Linkage Setting (Event Receiver)

| Receiver Call | Function Module |
|---|---|
| Receiver Function Module | ZRAL_REMOTE_CONNECT_SLAVE_DYN |
| Check Function Module | |
| Receiver Type Function Module | |
| Destination of Receiver | |
| Event Delivery | Using tRFC (Default) |
| | ☑ Linkage Activated |
| | ☐ Enable Event Queue |
| Behavior Upon Error Feedback | System defaults |
| Receiver Status | No errors |

PROCESS OBSERVER AND EVENT TYPE LINKAGE

TECHNICAL FIELD

The present disclosure relates to computer-implemented methods, software, and systems for monitoring processes.

BACKGROUND

Processes for manufacturing and business methods can include many steps, tasks or events. For example, tasks can be serial or parallel, and can be related by successor and predecessor relationships. Processes can be represented and tracked using computers. The tasks of some processes can occur in different locations and/or on different computers. Information about processes and their status can be provided over the Internet.

SUMMARY

The disclosure generally describes computer-implemented methods, software, and systems for tracking processes across multiple computers at multiple locations. For example, a master system, using a process observer, can monitor processes on one or more slave systems that do not have process observers locally. A process may be business-related, such as associated with a particular business object. Information about individual process steps that occur for the business object at various slave systems, for example, can be provided to the master system as part of a business object reporting structure. For example, an business-related event can occur at a slave system, and the slave system can notify the master system, which in turn can use the information to update a process framework associated with the associated business process.

The present disclosure relates to computer-implemented methods, software, and systems for montoriing processes. One computer-implemented method includes: receiving, at a process-observer-enabled server, a communication from a non-process-observer-enabled server; translating at least event information in the communication from a non-process-observer-compatible format to a process-observer-compatible format; adding an event in the process-observer-compatible format to a process observer queue for subsequent processing by a process observer with other events, wherein the process observer is configured to process events from the process observer queue, correlate application events with a defined workflow/process model, and create process instances in a process log wherein the process observer is configured to correlate application events during application execution with a defined process/workflow model and create process instances in a process log; and processing, by the process observer, at least one event from the process observer queue.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, the communication is from a slave system of the process observer and includes information about a business object event at the slave system.

In a second aspect combinable with any of the previous aspects, communication is received at the process-observer-enabled server from the non-process-observer-enabled server as a result of a remote function call that includes identification of a specified target module to be used by the process-observer-enabled server to process the communication.

In a third aspect combinable with any of the previous aspects, process observer includes one or more target function modules, and wherein communications from the non-process-observer-enabled server are received at a particular target function module.

In a fourth aspect combinable with any of the previous aspects, the non-process-observer-compatible format is a raw format of the corresponding slave system.

In a fifth aspect combinable with any of the previous aspects, processing the event from the process observer queue includes matching the event to a defined process/workflow model associated with at least one business object.

In a sixth aspect combinable with any of the previous aspects, processing the event includes mapping the event to a task in a process, determining at least one predecessor business object may be based on the business object/business document number available in the event container (for example an invoice document created from which the related purchase order document can be determined) to the task, and using the determination to update process data associated with the process.

The subject matter described in this specification can be implemented in particular implementations so as to realize one or more of the following advantages. First, having a master system with a process observer for monitoring processes of slave systems can alleviate the necessity to update legacy systems of the slave systems to newer systems with integrated monitoring software. Second, if legacy systems do need to be updated, the updates can be limited to having to integrate a single system (or reduced set) to allow for the integrated monitoring and observational aspects of a master-slave system.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for tracking processes across multiple computers at multiple locations. For example, a master system, using a process observer, can monitor processes on one or more slave systems that do not have process observers locally. As a result, the slave systems can provide business object reporting, e.g., by reporting, to the master system, process events that occur to a business object.

For example, the slave system, which is the event source, can include an event type linkage information that identifies a business object (e.g., invoice) associated with the event and the type of event (e.g., creating an invoice). Event type linkage information can further identify where and how communicatons are to be sent, e.g., to the master system using a remote function call. The master system can receive the communication and invoke a corresponding particular target function module that is customized to map event information into a usuable or preferred format of the master system, e.g., in a raw format for the non-POB-enabled system to the format of the POB-enabled system. The event information can then be processed and placed in a queue from which it can later be processed and mapped to a particular task at the master system. As a result, the process model associated with the business object can be updated to reflect the occurrence of the event (e.g., that an invoice associated with a particular purchase order was created).

Figure 1:
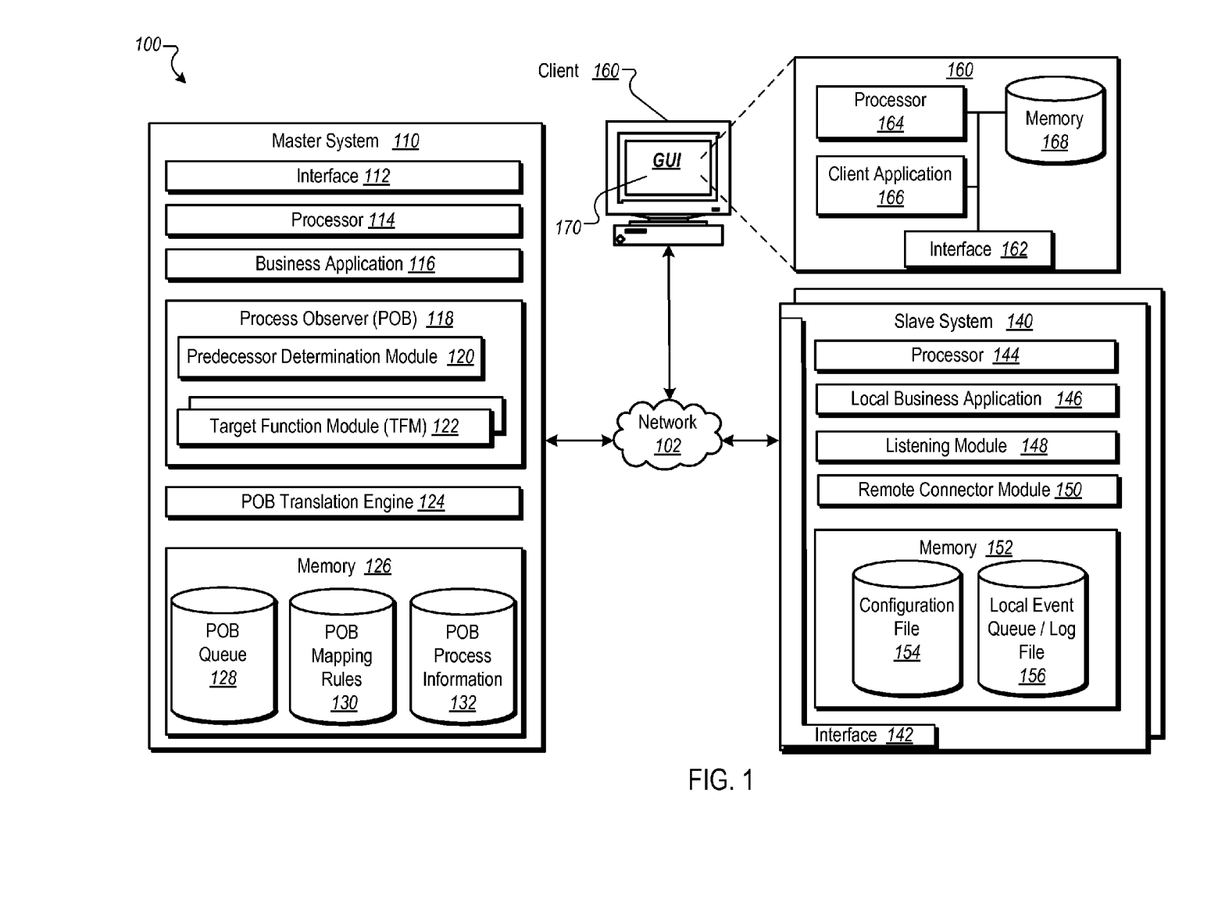
FIG. 1 is a block diagram illustrating an example environment for observing and monitoring processes in a master-slave system.

FIG. 1 illustrates an example environment 100 for observing and monitoring processes in a master-slave system. Specifically, the illustrated environment 100 includes, or is communicably coupled with, a master system 110, one or more slave systems 140 on which processes occur, and a client device 160 by which a user can access process information. For example, a user using user interfaces on the client device 160 may obtain reports and up-to-date status information associated with business-related processes and events that occur on the slave systems 140 (e.g., having no local process observers (or POBs)) for which processes are observed by the master system 110 (e.g., having a POB). In some implementations, more than one master system 110 can monitor the same slave system 140, and some systems can have combinations of elements of master and slave systems.

At a high level, the master system 110 comprises an electronic computing device operable to receive, transmit, process, store, or manage process data and other information associated with the environment 100. Specifically, the master system 110 illustrated in FIG. 1 is responsible for observing and monitoring business-related processes that occur at the one or more slave systems 140.

As used in the present disclosure, the term "computer" is intended to encompass any suitable processing device. For example, although FIG. 1 illustrates a single master system 110, the environment 100 can be implemented using two or more master systems 110, as well as computers other than servers, including a server pool. Indeed, the master system 110 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated master system 110 may be adapted to execute any operating system, including Linux, UNIX, Windows, Mac OS®, Java™, Android™, iOS or any other suitable operating system. According to some implementations, the master system 110 may also include, or be communicably coupled with, an e-mail server, a Web server, a caching server, a streaming data server, and/or other suitable server(s).

The master system 110 includes a process observer (POB) 118 that monitors processes, e.g., by correlating business application events during application execution (e.g., at the master system 110 itself and/or at the one or more slave systems 140) with a defined process/workflow model, and creating process instances in a process log. For example, any one of the slave systems 140 can have, occurring at it, one or more process events related to a business process or workflow. One example business process is a purchase order (e.g., associated with a purchase order business object), where different business-related steps associated with the purchase order may occur at different slave systems 140. For example, one slave system 140 may include business applications in which a purchase order is initially placed or accepted. Other slave systems 140 may include business applications in which the items in the purchase order are filled, e.g., a sales order is created, invoices are created and processed, one or more payments are made, among other steps subsequent to initiating a purchase order.

The POB 118 includes one or more target function modules (TFMs) 122, each of which is operable to communicate with a non-POB-enabled server (e.g., a slave system 140) for a particular event associated with a specific business object. The POB 118 can receive communications from the slave system 140 via remote function calls (RFCs) or other communications as triggered by the slave system 140. In some implementations, the POB 118 can make a request for the data in response to a periodic or triggered (e.g., manual request) event. When a business process-related event occurs at a slave system 140, for example, information about the event can be processed by a corresponding TFM 122, e.g., at the master system 110. For example, each event that occurs can be associated with a different one of multiple business applications and/or business processes, each of which may execute at different slave systems 140, all of which together can be responsible for the events related to a purchase order, from initialization of the purchase order to other events after that. Each TFM 122 can be associated with a particular event and business application. In some implementations, the TFMs 122 may be included within the POB 118, or they may be separate from, but accessible by, the POB 118. In some implementations, the POB 118 can be remote from the master system 110, e.g., accessible using the network 102.

In some implementations, the POB 118 includes a predecessor determination module 120 that can determine if explicit predecessor data is included in a communication received by the master system 110. In some implementations, the predecessor determination module 120 can dynamically determine one or more predecessors of an event based on data mining of the communication and/or searching current processes for predecessor/successor relationships. For example, a predecessor event for an accounts receivable update event may be a purchase payment received event.

The illustrated environment of FIG. 1 also includes the client device 160, or multiple client devices 160. The client device 160 may be any computing device operable to connect to, or communicate with, at least the master system 110 via the network 102 using a wire-line or wireless connection. In general, the client device 160 comprises an electronic computer device operable to receive, transmit, process, and store any appropriate data associated with the environment 100 of FIG. 1.

In some implementations, the POB 118 includes functionality that allows users/clients to view process information. For example, the POB 118 can provide or support applications by which a user using the client device 160 can obtain information about completed tasks associated with a purchase order. Some information that is viewed by the user, for example, can include information about events associated with the purchase order that the POB 118 has collected from each of the slave systems 140. In some implementations, the POB 118 can provide information to one or more automated processes, e.g., information that is provided to business and/or other applications that execute, without user interaction, on the one or more slave systems 140 or other systems.

The master system 110 also includes an interface 112, a processor 114, business applications 116, a POB translation engine 124, and a memory 126. The interface 112 is used by the master system 110 for communicating with other systems in a distributed environment—including the one or more slave systems 140 within the environment 100—connected to the network 102 (e.g., the client device 160), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The business application(s) 116 can include, for example, applications that run or process information from business processes. One example business application 116 is an application that tracks the processes involved in a purchase order, e.g., processes that may occur on slave systems 140. Additionally, the business application 116 can be an application that performs one or more actions, events, and/or business processes associated with the lifecycle of one or more business objects, end-to-end business processes, or other suitable data.

The master system 110 also includes a memory 126, or multiple memories 126. The memory 126 may include any type of memory or database module and may take the form of volatile and/or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the master system 110. Additionally, the memory 126 may include any other appropriate data, such as VPN applications, firmware logs and policies, firewall policies, a security or access log, print or other reporting files, as well as others. In some implementations, memory 126 includes a POB queue 128. For example, the TFMs 122 store and queue events in the POB queue 128, to be further processed by the POB 118. In some implementations, memory 126 also includes POB mapping rules 130 (e.g., that define how the POB or TFMs translate incoming data, such as to map an event to a task) and POB process information 132 (e.g., that stores information on currently-monitored processes). Other components within the memory 126 are possible.

Each slave system 140 includes an interface 162 for communicating with other systems (e.g., the master system 110), a processor 164 (e.g., for running local applications, including local business applications 146), a listening module 148 (e.g., for listening for business-related events that occur during execution of local business applications 146) and a remote connector module 150 (e.g., that the slave system 140 can use to manage communications (e.g., remote function calls (RFCs) to/with the master system 110)). Memory 152, for example, can include a configuration file 154 and a local event queue/log file 156. The configuration file 154, for example, identifies monitored business processes and their corresponding events, and further identifies a specific location (e.g., the master system 110) to which to send messages that contain event information. The local event queue/log file 156, for example, can contain a log of event information (e.g., resulting from the execution of local business applications 146 and further operate as a queue for sending messages based on information for the events in the queue.

One example sequence of events associated with the slave system 140 can begin when local business applications 146 are run, e.g., including an event that is a purchase order-related invoice creation. For example, the listening module 148 may detect the event and store information about the event in the local event queue/log file 156, e.g., with other previously-detected events. On an ongoing basis, the remote connector module 150 can process events in the local event queue/log file 156, e.g., using a first in, first out (FIFO) method or other sequence technique. When the purchase order-related is processed, the remote connector module 150 can copy event information into a message containing event information, and make a remote function call, e.g., to invoke the TFM 122 (corresponding to the event) to process the message at the master system 110.

The illustrated client device 160 further includes a client application 166. The client application 166 is any type of application that allows the client device 160 to request and view content on the client device 160. In some implementations, the client application 166 can be and/or include a Web browser. In some implementations, the client application 166 can use parameters, metadata, and other information received at launch to access a particular set of data from the master system 110. Once a particular client application 166 is launched, a user may interactively process a task, event, or other information associated with the master system 110. Further, although illustrated as a single client application 166, the client application 166 may be implemented as multiple client applications in the client device 160. In some instances, the client device 160 may remotely manage settings and/or operations of the master system 110 and/or one or more of the slave systems 140. This may include, for example, configuring the slave system's configuration to provide communications to the master system 110 that include event information for business-related events that occur on the slave systems 140.

The illustrated client device 160 further includes an interface 162, a processor 164, and a memory 168. The interface 162 is used by the client device 160 for communicating with other systems in a distributed environment—including within the environment 100—connected to the network 102, e.g., the master system 110, as well as other systems communicably coupled to the network 102 (not illustrated). Generally, the interface 162 comprises logic encoded in software and/or hardware in a suitable combination and operable to communicate with the network 102. More specifically, the interface 162 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 160 includes the processor 164. Although illustrated as the single processor 164 in FIG. 1, two or more processors 164 may be used according to particular needs, desires, or particular implementations of the environment 100. Each processor 164 may be a central processing unit (CPU), an application specific integrated circuit (ASIC), a field-programmable gate array (FPGA), or another suitable component. Generally, the processor 164 executes instructions and manipulates data to perform the operations of the client device 160. Specifically, the processor 164 executes the functionality required to send requests to the master system 110 and to receive and process responses from the master system 110.

The illustrated client device 160 also includes a memory 168, or multiple memories 168. The memory 168 may include any memory or database module and may take the form of volatile or non-volatile memory including, without limitation, magnetic media, optical media, random access memory (RAM), read-only memory (ROM), removable media, or any other suitable local or remote memory component. The memory 168 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 160. Additionally, the memory 168 may include any other appropriate data, such as VPN applications, firmware logs and policies, firewall policies, a security or access log, print or other reporting files, as well as others.

The illustrated client device 160 is intended to encompass any computing device such as a smart phone, tablet computing device, PDA, desktop computer, laptop/notebook computer, wireless data port, one or more processors within these devices, or any other suitable processing device. For example, the client device 160 may comprise a computer that includes an input device, such as a keypad, touch screen, or other device that can accept user information, and an output device that conveys information associated with the operation of the master system 110 or the client device 160 itself, including digital data, visual information, or a graphical user interface (GUI) 170, as shown with respect to and included by the client device 160. The GUI 170 interfaces with at least a portion of the environment 100 for any suitable purpose, including generating a visual representation of a Web browser. In particular, the GUI 170 may be used to view and navigate various Web pages located both internally and externally to the master system 110.

Figure 2:
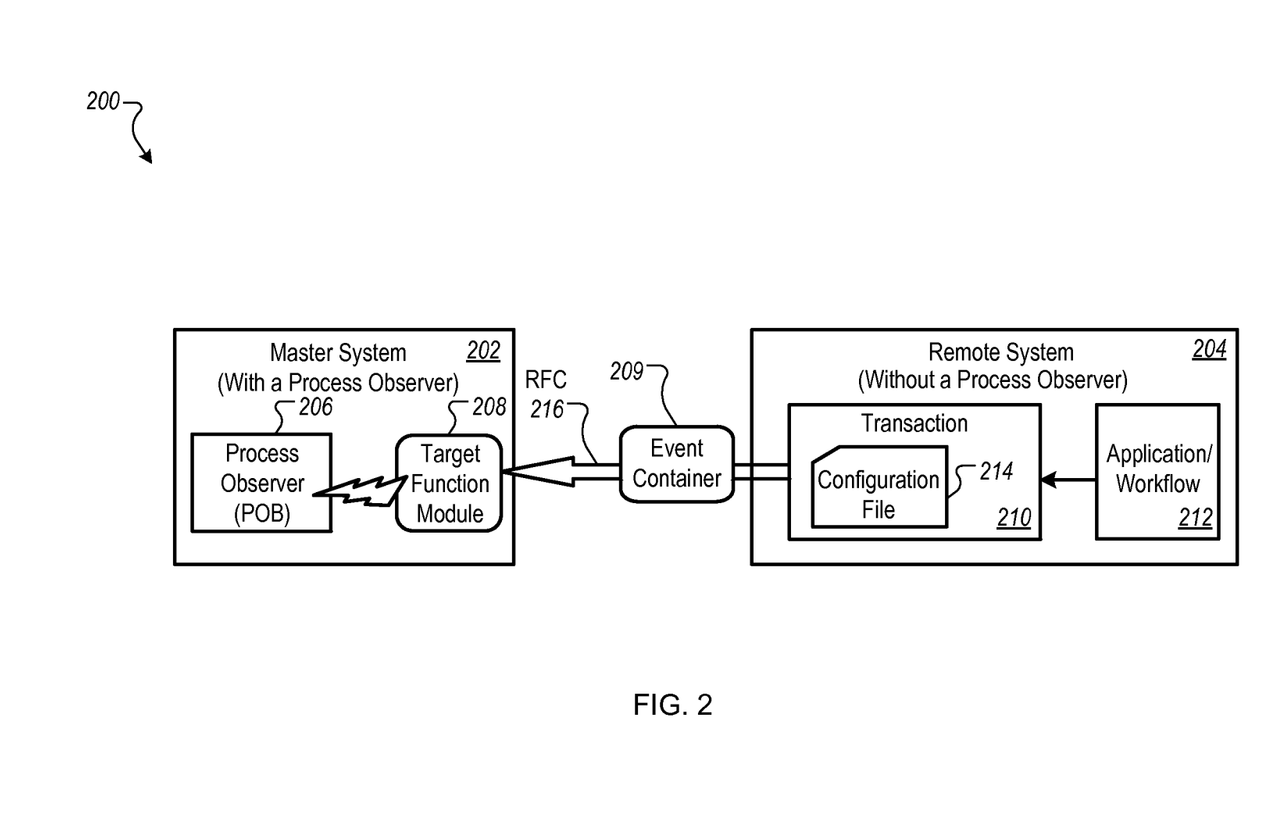
FIG. 2 is a block diagram illustrating an example scenario in which a target function module processes an event received from a slave system.

FIG. 2 is a block diagram illustrating an example scenario 200 in which a master system 202 receives and processes an event container 209 sent by a remote system 204. One primary reason for sending the event container 209, for example, is because the master system 202 may have a process observer for monitoring events at remote systems 204 which may not have process observers.

The scenario can begin when an event occurs at the remote system 204. For example, as part of an application/work flow 212 at the remote system 204, an event can occur, e.g., in a business application that is related to a business object. The remote system 204 can create a transaction 210 that includes information about the event, including, for example, an object type, a key, an event name, and other event information.

A configuration file 214 can contain information about monitored events at the remote system 204. The configuration file 214 can further identify a specific location (e.g., the master system 202) to which to send messages that contain event information, such as the event container 209. In some implementations, a remote function call 216 or some other mechanism can be used by the remote system 204 to send the event container 209 (or a set of event containers 209 when multiple events are sent as a bundle) to the master system 202. Alternatively, a process observer (POB) 206 may request information from the remote system 204 at a location where the transaction 210 is stored and/or logged at the remote system 204. For example, the transaction 210 can be in response to a manual or periodic request for the information from the POB 206). The contents of the event container 209 and where and when to send it can be defined, at least in part, by information in the configuration file 214.

At the master system 202, the target function module 208 processes the event container 209. The target function module 208 may be one of several target function modules 208 at the master system 202. The specific target function module 208 to be used to process the event container 209 can be identified, for example, in the remote function call (RFC) 216 or by information included in the event container 209. The target function module 208 may be included in and/or invoked by the process observer 206. In some instances, processing the event container 209 can include translating the information therein, placing the translated information into a corresponding queue, etc.

Figure 3:
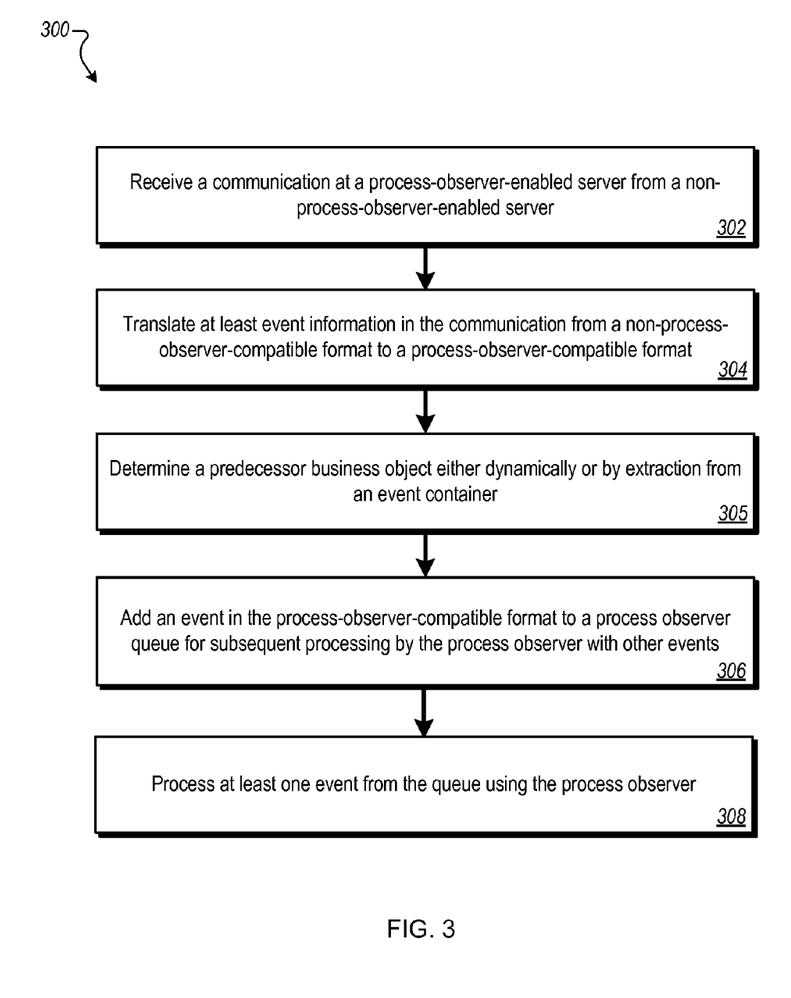
FIG. 3 is a flowchart of an example method for a process-observer-enabled server to monitor a non-process-observer-enabled server.

FIG. 3 is a flowchart of an example method 300 for a process-observer-enabled server to monitor a non-process-observer-enabled server. For clarity of presentation, the description that follows generally describes method 300 in the context of FIG. 1. However, it will be understood that the method 300 may be performed, for example, by any other suitable system, environment, software, and hardware, or a combination of systems, environments, software, and hardware as appropriate. For example, the master system 110 can be used to execute the method 300, e.g., using the POB 118 and other components of the master system 110.

At 302, a communication from a non-process-observer-enabled (non-POB-enabled) server is received at a POB-enabled server. In some implementations, the communication is from a slave system of the process observer and includes information about a business object event at the slave system. Alternatively, the communication may be triggered in response to a request for information from the POB-enabled server (e.g., a periodic or manual request). As an example, the POB 118 of the master system 110 can receive a message containing event information from a slave system, e.g., that includes event information associated with creating an invoice for a purchase order. For example, the POB 118 includes one or more TFMs 122, and the communication from the non-POB-enabled server is received at a particular TFM 122 (e.g., a TFM 122 associated with creating invoices for purchase orders). In some implementations, the communication is received at the master system 110 (e.g., a POB-enabled server) as a result of a remote function call that includes identification of a specified target module (e.g., a specified TFM 122) to be used to process the communication.

At 304, at least event information in the communication is translated from a non-POB-compatible format to a POB-compatible format. As an example, the communication (e.g., message containing event information) that is received from the slave system can be in a non-POB-compatible format (e.g, a raw format) that is applicale to the slave system 140, and this format can be different from the POB-compatible format used by the master system 110. The POB translation engine 124, for example, can translate the event in the raw format to the POB-compatible format that the master system 110 needs for subsequent processing.

At 305, a predcessor business object is determined either dynamically or by extraction from an event container. For example, the event container can be included with the message and can identify related process instances and/or process log entries.

At 306, an event in the POB-compatible format is added to a POB queue for subsequent processing with other events. For example, the POB 118 can add the translated purchase order invoice creation event to the POB queue 128.

At 308, at least one event is processed from the POB queue using the POB. As an example, the processor 114 can process each event, such as when the event reaches the front of the POB queue 128 in a FIFO or other processing order.

In some implementations, processing the event from the process observer queue includes matching the event to a defined process/workflow model associated with at least one business object. For example, the processor 114 can use information from the event to access POB mapping rules 130 to determine a portion of a business-object process to which the event belongs. For example, while the POB mapping rules 130 may identify the business object (e.g., purchase orders) associated with the event, the processor 114 can use other information about the event to update POB process information for the particular purchase order and invoice for which the invoice creation occurred on the slave system 140.

Figure 4:
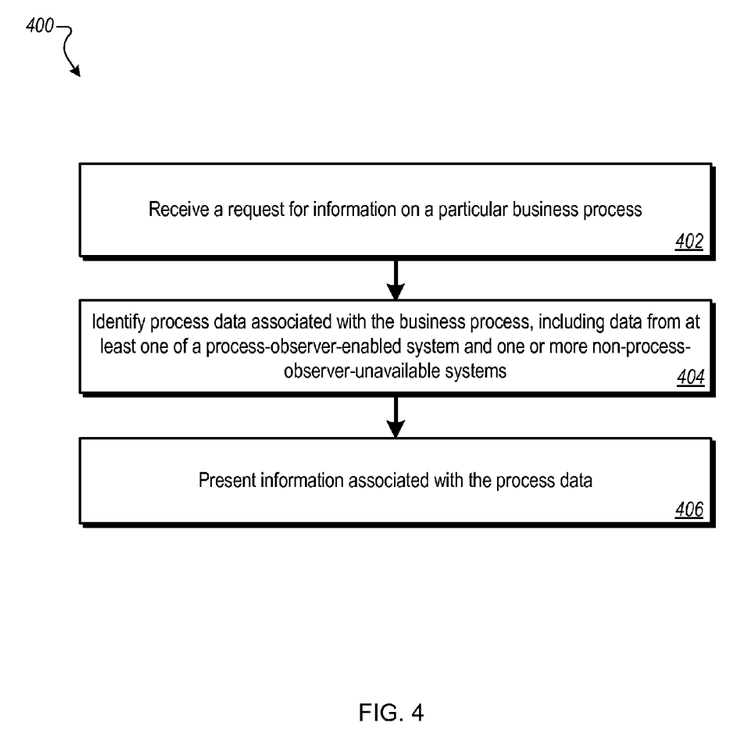
FIG. 4 is a flowchart of an example method for presenting information associated with process data.

FIG. 4 is a flowchart of an example method 400 for presenting information associated with process data. For clarity of presentation, the description that follows generally describes method 400 in the context of FIG. 1. However, it will be understood that the method 400 may be performed, for example, by any other suitable system, environment, software, and hardware, or a combination of systems, environments, software, and hardware as appropriate. For example, the client device 160 and/or its components can be used to execute the method 400, e.g., using information accessed from the master system 110.

At 402, a request is received for information on a particular business process. For example, a user can use a client application 166 to query information about a particular process (e.g., a specific purchase order), or to select a report that provides process information. Other ways for requesting information can occur, such as automated applications not involving user input. The request can be received by the interface 112 at the master system 110 and/or by the interface 142 at one or more slave systems 140.

At 404, process data is identified that is associated with the business process, including data from at least one of a POB-enabled system and one or more non-POB-unavailable systems. As an example, at the master system 110, based on information in the request, the business application 116 can access POB process information 132. In another example, at one or more of the slave systems 140, the local business application 146 can access the local event queue/log file 156. For example, in some situations, event information that has been sent to the master system 110 may be sitting, un-processed, in the POB queue 128.

At 406, information associated with the process data is presented. For example, the client application 166 can present the process information to the user using the GUI 170.

Figure 5:
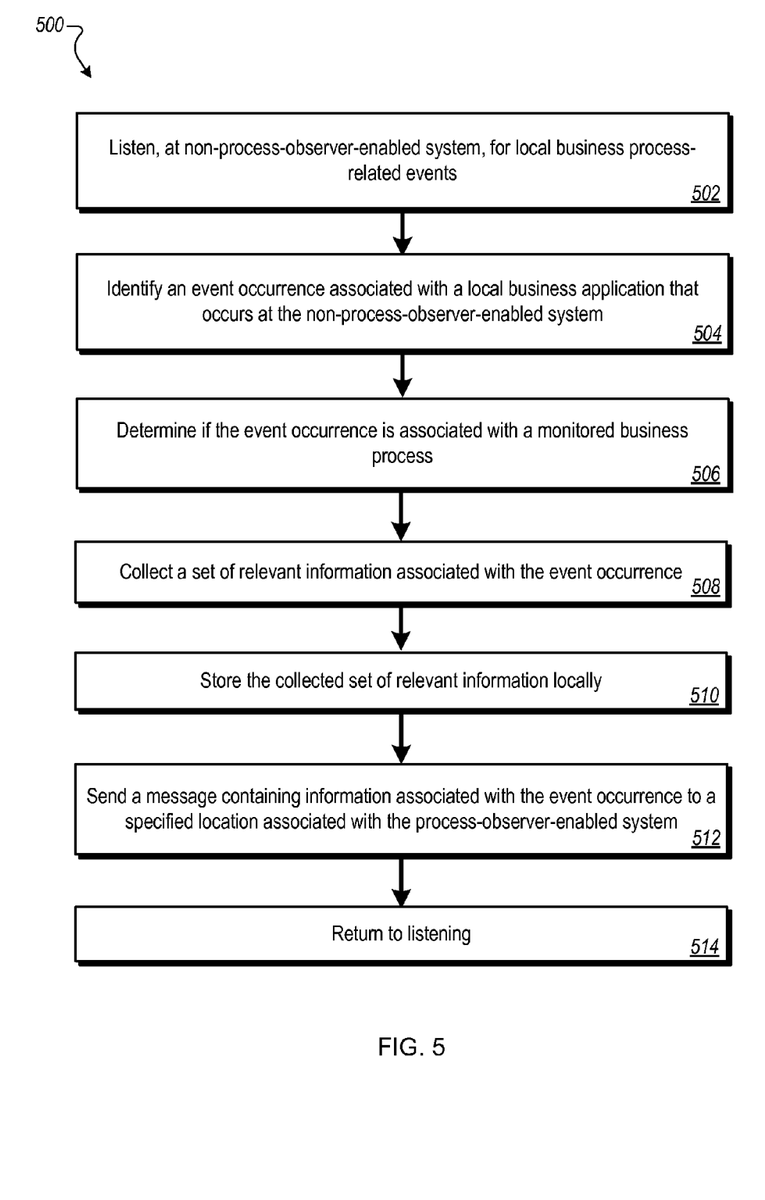
FIG. 5 is a flowchart of an example method for a non-process-observer-enabled system to provide process event information to a process-observer-enabled system.

FIG. 5 is a flowchart of an example method 500 for a non-process-observer-enabled system to provide process event information to a process-observer-enabled system. For clarity of presentation, the description that follows generally describes method 500 in the context of FIGS. 1 and 2. However, it will be understood that the method 500 may be performed, for example, by any other suitable system, environment, software, and hardware, or a combination of systems, environments, software, and hardware as appropriate. For example, the slave system 140 and/or its components can be used to execute the method 500.

At 502, at a non-POB-enabled system, local business process-related events are listened for. For example, the listening module 148 can listen for events in local business applications 146 executing at the slave system 140 which may be one of multiple slave systems that are each being monitored by one or more POB-enabled systems (e.g., the master system 110). The systems may be related systems that are physically local to each other (e.g., in the same room or building), or they may be remote from each other (e.g., in different countries).

At 504, an event occurrence is identified that is associated with a local business application that occurs at the non-POB-enabled system. For example, the listening module 148 can identify that an invoice has been created for a specific purchase order, e.g., during execution of a local business application 146 that is associated with invoices and/or purchase orders.

At 506, it is determined if the event occurrence is associated with a monitored business process. As an example, the slave system 140 can use information from the local business application 146 to determine if the created invoice is associated with a purchase order-related business process that is being tracked locally in the local event queue/log file 156.

At 508, a set of relevant information associated with the event occurrence is collected. For example, the listening module 148 can collect event information from the local business application 146 that logged the event. Event information can include, for example, information about an invoice that is created and information about the associated purchase order.

At 510, the collected set of relevant information is stored locally. As an example, the listening module 148 can store the information about an invoice and associated purchase order in the local event queue/log file 156, which can serve as a queue for sending messages (e.g., to a master system) containing event information.

At 512, a message containing information associated with the event occurrence is sent to a specified location associated with the POB-enabled system. For example, referring to FIG. 2, the event container 209 that contains the event information can be sent to a master system (e.g., master system 110 or master system 202) for processing. The message, for example, with the event or multiple events stored previously in the order of their occurrence, can be sent periodically (e.g., every one minute) to a specified location associated with the POB-enabled system.

At 514, listening for local business process-related events resumes. As an example, the listening module 148 can listen for other events at the slave system 140, e.g., events that occur during execution of local business applications 146.

Figure 6:
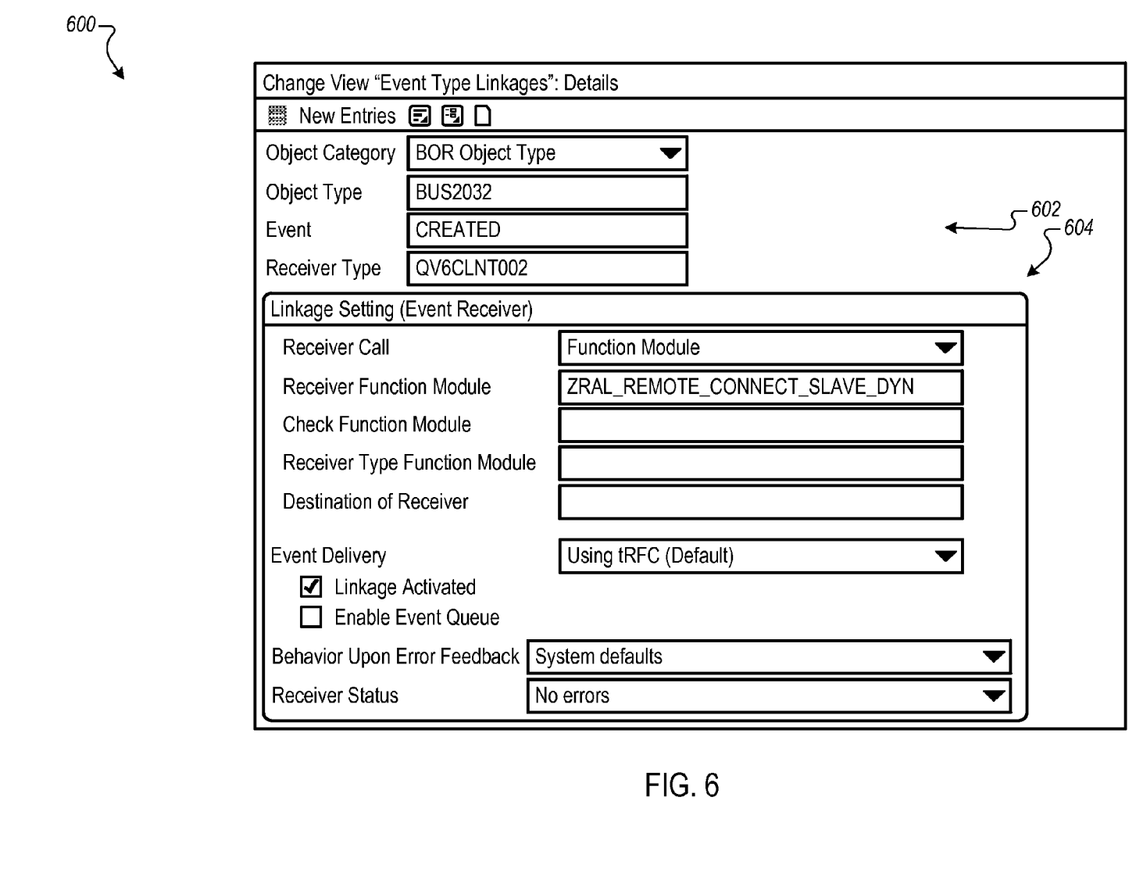
FIG. 6 shows an example user interface screen for configuring business-related event communications from a slave system to a master system.

FIG. 6 shows an example user interface screen 600 for configuring business-related event communications from a slave system to a master system. For example, the user interface screen 600 can be used for providing parameters and settings corresponding to a communication from one of the slave systems 140 to the master system 110, e.g., that includes information about a business-related event that can occur at the slave system 140.

The example user interface screen 600 includes a header area 602 that identifies object and event information regarding the business object and event associated with the communication. For example, the object and event information can include an object category, an object type (e.g., invoice), an event type (e.g., creation, update, delete, etc.), and a receiver type. Different combinations of business objects and events can have different object and event information.

A linkage information area 604 can include linkage information as to how the communication is to be made (e.g., originating at the slave system 140) and how the communication is to be handled (e.g., by the master system 110). For example, the linkage information can include a call type (e.g., remote function call) and a receiver function module name, e.g., a function name corresponding to a particular one of the TFMs 122 and the behavior in case of any error. Other fields are possible for the linkage information area 604 and the header area 602.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving, at a process-observer-enabled server, a communication from a non-process-observer-enabled server, wherein the communication is received at the process-observer-enabled server from the non-process-observer-enabled server as a result of a remote function call made by the non-process-observer-enabled server, wherein the remote function call includes identification of a specified target module at the process-observer-enabled server to be used to process the communication;
translating, at the process-observer-enabled server, at least event information included within the received communication from a non-process-observer-compatible format to a process-observer-compatible format;
adding an event in the process-observer-compatible format to a process observer queue for subsequent processing by a process observer with other events, wherein the process observer is configured to process events from the process observer queue, correlate application events with a defined workflow/process model, and create process instances in a process log; and
processing, by the process observer, the event from the process observer queue.

2. The method of claim 1 wherein the communication is from a slave system of the process observer and includes information about a business object event at the slave system.

3. The method of claim 2 wherein the non-process-observer-compatible format is a raw format of the corresponding slave system.

4. The method of claim 1 wherein processing the communication includes translating at least event information included within the communication.

5. The method of claim 1 wherein the process observer includes one or more target function modules, and wherein communications from the non-process-observer-enabled server are received at a particular target function module identified in a remote function call made by the non-process-observer-enabled server.

6. The method of claim 1 wherein processing the event from the process observer queue includes matching the event to a defined process/workflow model associated with at least one business object.

7. The method of claim 1 wherein processing the event includes:
mapping the event to a task in a process;
determining at least one predecessor to the task; and
using the determination to update process data associated with the process.

8. A computer-program product, the computer program product comprising computer-readable instructions embodied on tangible, non-transitory media, the instructions operable when executed by at least one computer to:
receive a communication from a non-process-observer-enabled server, wherein the communication is received at the process-observer-enabled server from the non-process-observer-enabled server as a result of a remote function call made by the non-process-observer-enabled server, wherein the remote function call includes identification of a specified target module at the process-observer-enabled server to be used to process the communication;
translate, at the process-observer-enabled server, at least event information included within the received communication from a non-process-observer-compatible format to a process-observer-compatible format;

add an event in the process-observer-compatible format to a process observer queue for subsequent processing by a process observer with other events, wherein the process observer is configured to process events from the process observer queue, correlate application events with a defined workflow/process model, and create process instances in a process log; and process at least one event from the process observer queue.

9. The computer program product of claim 8 wherein the communication is from a slave system of the process observer and includes information about a business object event at the slave system.

10. The computer program product of claim 9 wherein the non-process-observer-compatible format is a raw format of the corresponding slave system.

11. The computer program product of claim 8 wherein processing the communication includes translating at least event information included within the communication.

12. The computer program product of claim 8 wherein the process observer includes one or more target function modules, and wherein communications from the non-process-observer-enabled server are received at a particular target function module identified in a remote function call made by the non-process-observer-enabled server.

13. The computer program product of claim 8 wherein processing the event from the process observer queue includes matching the event to a defined process/workflow model associated with at least one business object.

14. The computer program product of claim 8 wherein processing the event includes:
mapping the event to a task in a process;
determining at least one predecessor to the task; and
using the determination to update process data associated with the process.

15. A system, comprising:
memory operable to store at least process and event information; and
at least one hardware processor interoperably coupled to the memory and operable to perform instructions to:
receive a communication from a non-process-observer-enabled server, wherein the communication is received at the process-observer-enabled server from the non-process-observer-enabled server as a result of a remote function call made by the non-process-observer-enabled server, wherein the remote function call includes identification of a specified target module at the process-observer-enabled server to be used to process the communication;
translate, at the process-observer-enabled server, at least event information included within the received communication from a non-process-observer-compatible format to a process-observer-compatible format;
add an event in the process-observer-compatible format to a process observer queue for subsequent processing by a process observer with other events, wherein the process observer is configured to process events from the process observer queue, correlate application events with a defined workflow/process model, and create process instances in a process log; and process at least one event from the process observer queue.

16. The system of claim 15 wherein the communication is from a slave system of the process observer and includes information about a business object event at the slave system.

17. The system of claim 16 wherein the non-process-observer-compatible format is a raw format of the corresponding slave system.

18. The system of claim 15 wherein processing the communication includes translating at least event information included within the communication.

19. The system of claim 15 wherein the process observer includes one or more target function modules, and wherein communications from the non-process-observer-enabled server are received at a particular target function module identified in a remote function call made by the non-process-observer-enabled server.

20. The system of claim 15 wherein processing the event from the process observer queue includes matching the event to a defined process/workflow model associated with at least one business object.

21. A computer-implemented method comprising:
receiving, at a process-observer-enabled server that includes a process observer, a communication from a slave system of a non-process-observer-enabled server, wherein the communication includes information about a business object event at the slave system, wherein the communication is received as a result of a remote function call made by the non-process-observer-enabled server, wherein the remote function call includes identification of a specified target function module at the process-observer-enabled server to be used to process the communication, and wherein the communication is received at the specified target function module;
translating, by the specified target function module at the process-observer-enabled server, at least event information included within the received communication from a non-process-observer-compatible format to a process-observer-compatible format, wherein the non-process-observer-compatible format is a raw format of the corresponding slave system;
adding an event in the process-observer-compatible format to a process observer queue for subsequent processing by the process observer with other events, wherein the process observer is configured to process events from the process observer queue, correlate application events with a defined workflow/process model, and create process instances in a process log; and
processing, by the process observer, the event from the process observer queue, including matching the event to a defined process/workflow model associated with at least one business object, and wherein processing the event includes:
mapping the event to a task in a process;
determining at least one predecessor to the task; and
using the determination to update process data associated with the process.

* * * * *